(12) United States Patent
De Jong

(10) Patent No.: US 7,828,218 B1
(45) Date of Patent: Nov. 9, 2010

(54) METHOD AND SYSTEM OF COMMUNICATING DEVICES, AND DEVICES THEREFOR, WITH PROTECTED DATA TRANSFER

(75) Inventor: Eduard Karel De Jong, Amsterdam (NL)

(73) Assignee: Oracle America, Inc., Redwood City, CA (US)

( * ) Notice: Subject to any disclaimer, the term of this patent is extended or adjusted under 35 U.S.C. 154(b) by 1733 days.

(21) Appl. No.: 10/333,355

(22) PCT Filed: Jul. 20, 2000

(86) PCT No.: PCT/NL00/00510

§ 371 (c)(1),
(2), (4) Date: Sep. 5, 2006

(87) PCT Pub. No.: WO02/09046

PCT Pub. Date: Jan. 31, 2002

(51) Int. Cl.
*G06K 19/06* (2006.01)
(52) U.S. Cl. .................................. 235/492; 707/999.1
(58) Field of Classification Search ................ 235/375, 235/380, 382, 487, 492
See application file for complete search history.

(56) References Cited

U.S. PATENT DOCUMENTS

| 4,425,642 | A | 1/1984 | Moses et al. |
|---|---|---|---|
| 4,582,985 | A | 4/1986 | Lofberg |
| 4,694,396 | A | 9/1987 | Weisshaar et al. |
| 4,757,495 | A | 7/1988 | Decker et al. |
| 4,853,522 | A | 8/1989 | Ogasawara |
| 4,874,935 | A | 10/1989 | Younger |
| 4,921,278 | A | 5/1990 | Shiang et al. |
| 4,930,129 | A | 5/1990 | Takahira |
| 4,953,160 | A | 8/1990 | Gupta |
| 5,057,997 | A | 10/1991 | Chang et al. |
| 5,148,546 | A | 9/1992 | Blodgett |
| 5,177,768 | A | 1/1993 | Crespo et al. |
| 5,204,663 | A | 4/1993 | Lee |

(Continued)

FOREIGN PATENT DOCUMENTS

DE 4126213 2/1993

(Continued)

OTHER PUBLICATIONS

Sun Microsystems, Inc., "Java Card Runtime Environment (JCRE) 2.1 Specification," Final Revision 1.0, Feb. 24, 1999.

(Continued)

*Primary Examiner*—Thien M. Le
*Assistant Examiner*—Christopher Stanford
(74) *Attorney, Agent, or Firm*—Marsh Fischmann & Breyfogle LLP; Kent Lembke; Jonathon A. Szumny

(57) ABSTRACT

A method and a communicating system to enhance the reliability of communication between devices by protecting against failure of a device, e.g. due to power interruption. Additional data is included in communication primitives transmitted between communicating devices. The additional data relates to state data of the device having generated the additional data. The additional data is used to check the state data. The state data may also be derivable from the additional data upon receiving the additional data back from an other device.

22 Claims, 4 Drawing Sheets

U.S. PATENT DOCUMENTS

| | | |
|---|---|---|
| 5,204,897 A | 4/1993 | Wyman |
| 5,283,885 A | 2/1994 | Hollerbauer |
| 5,365,576 A | 11/1994 | Tsumura et al. |
| 5,404,377 A | 4/1995 | Moses |
| 5,446,901 A | 8/1995 | Owicki et al. |
| 5,452,431 A | 9/1995 | Bournas |
| 5,453,602 A | 9/1995 | Hanada |
| 5,469,559 A | 11/1995 | Parks et al. |
| 5,479,509 A | 12/1995 | Ugon |
| 5,481,715 A | 1/1996 | Hamilton et al. |
| 5,511,176 A | 4/1996 | Tsuha |
| 5,517,645 A | 5/1996 | Stutz et al. |
| 5,534,372 A | 7/1996 | Koshizuka et al. |
| 5,544,246 A | 8/1996 | Mandelbaum et al. |
| 5,594,227 A | 1/1997 | Deo |
| 5,649,118 A | 7/1997 | Carlisle et al. |
| 5,649,188 A | 7/1997 | Nomura et al. |
| 5,657,379 A | 8/1997 | Honda et al. |
| 5,721,781 A | 2/1998 | Deo et al. |
| 5,742,756 A | 4/1998 | Dillaway et al. |
| 5,754,649 A | 5/1998 | Ryan et al. |
| 5,764,763 A | 6/1998 | Jensen et al. |
| 5,768,385 A | 6/1998 | Simon |
| 5,781,723 A | 7/1998 | Yee et al. |
| 5,790,489 A | 8/1998 | O'Connor |
| 5,802,519 A | 9/1998 | De Jong |
| 5,805,899 A | 9/1998 | Evans et al. |
| 5,832,119 A | 11/1998 | Rhoads |
| 5,862,117 A | 1/1999 | Fuentes et al. |
| 5,869,823 A | 2/1999 | Bublitz et al. |
| 5,881,152 A | 3/1999 | Moos |
| 5,884,316 A | 3/1999 | Bernstein et al. |
| 5,889,868 A | 3/1999 | Moskowitz et al. |
| 5,894,550 A | 4/1999 | Thiriet |
| 5,896,393 A | 4/1999 | Yard et al. |
| 5,905,798 A | 5/1999 | Nerlikar et al. |
| 5,905,819 A | 5/1999 | Daly |
| 5,912,453 A | 6/1999 | Gungl et al. |
| 5,915,027 A | 6/1999 | Cox et al. |
| 5,930,363 A | 7/1999 | Stanford et al. |
| 5,940,363 A | 8/1999 | Ro et al. |
| 6,005,940 A | 12/1999 | Kulinets |
| 6,052,690 A | 4/2000 | De Jong |
| 6,055,615 A | 4/2000 | Okajima |
| 6,058,483 A | 5/2000 | Vannel |
| 6,094,656 A | 7/2000 | De Jong |
| 6,104,812 A | 8/2000 | Koltai et al. |
| 6,128,627 A | 10/2000 | Mattis et al. |
| 6,168,207 B1 | 1/2001 | Nishizawa |
| 6,173,391 B1 | 1/2001 | Tabuchi et al. |
| 6,182,158 B1 | 1/2001 | Kougiouris et al. |
| 6,212,633 B1 | 4/2001 | Levy et al. |
| 6,220,510 B1 | 4/2001 | Everett et al. |
| 6,241,153 B1 | 6/2001 | Tiffany, III |
| 6,250,555 B1 | 6/2001 | Inamoto |
| 6,257,486 B1 | 7/2001 | Teicher et al. |
| 6,257,490 B1 | 7/2001 | Tafoya |
| 6,282,700 B1 | 8/2001 | Grover et al. |
| 6,292,874 B1 | 9/2001 | Barnett |
| 6,295,313 B1 | 9/2001 | Noma et al. |
| 6,310,956 B1 | 10/2001 | Morito et al. |
| 6,311,186 B1 | 10/2001 | MeLampy et al. |
| 6,311,280 B1 | 10/2001 | Vishin |
| 6,321,981 B1 | 11/2001 | Ray et al. |
| 6,325,285 B1 | 12/2001 | Baratelli |
| 6,345,104 B1 | 2/2002 | Rhoads |
| 6,349,336 B1 | 2/2002 | Sit et al. |
| 6,374,355 B1 | 4/2002 | Patel |
| 6,385,645 B1 | 5/2002 | De Jong |
| 6,480,831 B1 | 11/2002 | Cordery et al. |
| 6,480,935 B1 | 11/2002 | Carper et al. |
| 6,484,946 B2 | 11/2002 | Matsumoto et al. |
| 6,535,997 B1 | 3/2003 | Janson et al. |
| 6,546,112 B1 | 4/2003 | Rhoads |
| 6,572,025 B1 | 6/2003 | Nishikado et al. |
| 6,608,911 B2 | 8/2003 | Lofgren et al. |
| 6,742,712 B1 | 6/2004 | Kawaguchi et al. |
| 6,808,118 B2 | 10/2004 | Field |
| 7,114,032 B2 | 9/2006 | Challenger et al. |
| 2005/0129334 A1 | 6/2005 | Wilder et al. |

FOREIGN PATENT DOCUMENTS

| | | |
|---|---|---|
| DE | 4242247 A1 | 6/1994 |
| DE | 19600081 | 7/1997 |
| EP | 0190733 | 8/1986 |
| EP | 0251861 A1 | 1/1988 |
| EP | 0466969 | 1/1992 |
| EP | 0581317 A2 | 2/1994 |
| EP | 0666550 | 8/1995 |
| EP | 0674295 A1 | 9/1995 |
| EP | 0723226 | 7/1996 |
| EP | 0849734 A2 | 6/1998 |
| EP | 0864996 A2 | 9/1998 |
| EP | 0 893 752 A1 | 1/1999 |
| EP | 0917152 A1 | 5/1999 |
| FR | 2776153 | 9/1999 |
| JP | 01277993 A | 11/1989 |
| JP | 02156357 A | 6/1990 |
| JP | 05089303 A | 4/1993 |
| JP | 09326046 A | 12/1997 |
| JP | 10020780 A | 1/1998 |
| JP | 200015886 | 1/2000 |
| JP | 2001052143 A | 2/2001 |
| JP | 2001126046 | 5/2001 |
| WO | WO 87/07062 | 11/1987 |
| WO | WO 89/02140 | 3/1989 |
| WO | WO 94/10657 | 5/1994 |
| WO | WO 97/41562 | 11/1997 |
| WO | WO 98/19237 | 5/1998 |
| WO | WO 98/37526 | 9/1998 |
| WO | WO 99/16030 | 9/1998 |
| WO | WO 99/35791 | 7/1999 |
| WO | WO 99/38162 | 7/1999 |

OTHER PUBLICATIONS

Chan, "Infrastructure of Multi-Application Smart Card," http://home.hkstar.com/~alanchan/papers/multiApplicationSmartCard/, Jul. 25, 2002.

Cordonnier, et al., "The Concept of Suspicion: A New Security Model for Identification Management in Smart Cards," http://inforge.unil.ch/isdss97/papers/48.htm, (1997).

Daniels, John et al., "Strategies for Sharing Objects in Distributed Systems," JOOP, Object Designers Ltd., UK., pp. 27-36, Jan. 1993.

Gong, L. et al., "Going Beyond the Sandbox: An Overview of the New Security Architecture in the JavaDevelopment Kit 1.2" Proc. Usenix Sym. Internet Technologies and Systems, Dec. 8, 1997.

Islam, et al., "A Flexible Security Model for Using Internet Content," IBM Thomas J. Watson Research Center Papers, 'Online!', Jun. 28, 1997, from http://www.ibm.com/java/education/flexsecurity.

Lee, Chan Y., "Detecting Out-Of-Range References," http://127.0.0.1:8080/vtopic/isapi?action+View&VdkVgwKev=%2E@2E%2Fdata%2F1 993%2F, Jul. 24, 2002.

K. Matsui, et al., "Video-Steganography: How to Secretly Embed a Signature in a Picture", IMA Intellectual Property Project Proceedings, vol. 1, Issue 1, pp. 187-206, (Jan. 1994).

Philips Semiconductor, "Designers Offered First 16-Bit Smart Card IC Architecture with Development Tools," Press Release, Jul. 25, 2002.

Ritchey, Tim, "Advanced Topics: The Java Virtual Machine," Java!, Chapter 14, pp. ii-x and 325-346, Sep. 22, 1995.

Sun Microsystems, Inc., "Java Card™ 2.0 Language Subset and Virtual Machine Specification," Oct. 13, 1997, Revision 1.0 Final.

Sun Microsystems, Inc., "Java Card™ 2.0 Programming Concepts," Oct. 15, 1997, Revision 1.0 Final.

"Sun Microsystems Announces Javacard API," Business Wire, Oct. 1996.

Sun Microsystems, Inc., "Java Card Runtime Environment (JCRE) 2.1 Specification—Draft 2," Dec. 14, 1998.

"Java Card Applet Developer's Guide," Revision 1.12, Aug. 19, 1998, Sun Microsystems, Inc.

Sun Microsystems, Inc., "Java Card™ 2.0 Application Programming Interfaces," Oct. 13, 1997, Revision 1.0 Final.

Yukihiro, Ukai, "Storage Medium and Storage Medium Driving Device", Patent Abstracts of Japan, JP 11161551 (Jun. 18, 1999).

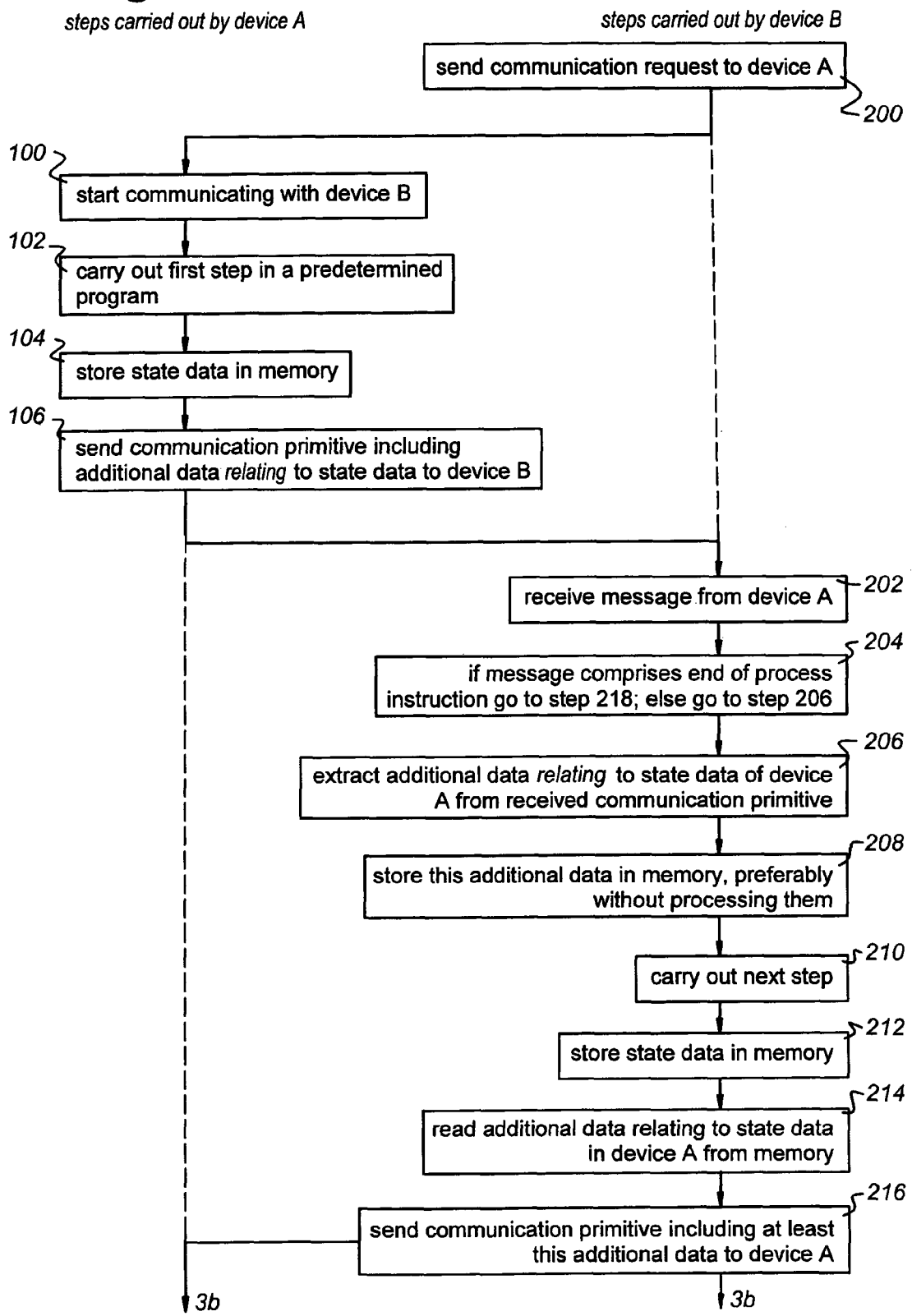

METHOD AND SYSTEM OF COMMUNICATING DEVICES, AND DEVICES THEREFOR, WITH PROTECTED DATA TRANSFER

BACKGROUND

1. Field of the Invention

The present invention relates to a method of communicating between a first device and a second device. The invention is specifically applicable in the field of smart cards communicating with terminals.

2. Relevant Background

Communications between smart cards and terminals are usually used to conduct one of a plurality of secure protocols that are needed for a service to be provided by the smart cards.

Especially when using a contactless smart card, a problem may arise from the fluctuating supply current from the terminal to the smart card due to movement of the smart card through an energizing electromagnetic field. The power fluctuations may be so strong and fast that the smart card may lose supply power before performing all communication steps required by a protocol. What is needed is a mechanism to continue a protocol after a full or partial loss of power and in general to assure integrity of the smart card data used in performing the protocol. Due to the risks of power fluctuations, normally all communication steps required by a protocol for a contactless smart card need be done within 150 msec. There is a need to increase the period of time available for the protocol, without introducing further risks as to communication failures.

WO-A-89/02140 (Eglise e.g.) discloses a mechanism against a data carrying device, like a card or a token, being taken away from a terminal prior to completion of a transaction. The data carrying device is storing credit value which is decremented under the control of a machine during the course of a service. Such a service may be a telephone call or providing electricity. The problem to be solved by this prior art document is to ensure that a user of the data carrying device is allowed to remove this device from the terminal at any time without losing important credit data which might occur when the user withdraws the device from the terminal prior to completion of a transaction. A similar loss of relevant credit data might occur when power is temporarily lost.

To solve this problem, the data carrying device according to Eglise e.a., each time a data communication step with the machine is carried out, stores additional information which is as indication for the data communication step concerned. To that end, Eglise e.a. propose to use two flags and three parameters. The values of the flags change in accordance with the steps made whereas the parameter values change in accordance with the stored credit value and its updates during successive operations. Whenever a data carrying device is removed from the machine too early or power is lost, the values of the flags and the parameters which are stored in the non-volatile memory of the data carrying device are a unique indication of the last performed communication step. Thus, when communications between the machine and the data carrying device start again the previous transaction can still be successfully completed.

U.S. Pat. No. 4,877,945 (Fujisaki) discloses an IC card which is provided with a function to exclude erroneous recording. The IC card is arranged to communicate with a terminal. At the beginning of a communication, the terminal sends a start command whereas, at the end of the communication it sends an end command to the IC card. Upon receiving the start command, the IC card checks whether a validity flag stored in a table in its EEPROM memory indicates either a valid status or an invalid status. An invalid status indicates that the last communication procedure between the IC card and a terminal has not been completed correctly, whereas a valid status indicates that the last communication procedure has been completed correctly.

When, upon receiving a start command, the IC card detects that its validity flag is valid it starts the communication procedure with the terminal after having changed the status of the validity flag into "invalid". It carries out the communication procedure with the terminal and upon receiving the end command from the terminal it changes the validity flag into "valid". However, when the communication procedure is interrupted prior to completion the validity flag remains invalid thus indicating that its data content is invalid.

When, upon receiving a start command, the IC card detects that its validity flag is invalid it informs the terminal thereof and no communication will be carried out. Thus, no communication procedure can be carried out with an IC card having invalid data.

In order to reuse an IC card having invalid data, Fujisaki discloses a correction mechanism which includes sending an end command to the IC card making the IC card change its validity flag to "valid".

U.S. Pat. No. 3,636,695 (Feiken) discloses a similar mechanism against interruption of communication between an IC card and a terminal, Feiken also uses a validity flag to indicate whether or not a transaction has been correctly completed on the card. Moreover, Feiken discloses a mechanism for correctly completing an unfinished balance process after which not only the validity flag is reset to its valid status but also the data content of the card will have the correct value.

SUMMARY OF THE INVENTION

An objective of the present invention is to enhance the reliability of communications between two communicating devices by protecting against failure of one or more of those devices, e.g. due to power interruption. Such communicating devices may be a smart card and a terminal but can alternatively be of any known type, e.g. computers communicating with one another through a network.

In order to obtain this object, the present invention in a first embodiment claims a method of communicating between at least a first device and a second device;

the first device comprising a first processor, first memory means and first input/output means, the first memory means and first input/output means being coupled to the first processor;

the second device comprising a second processor, second memory means and second input/output means, the second memory means and second input/output means being coupled to the second processor;

the method comprising at least the following steps carried out by the first processor:

a. carrying out a first program step in accordance with a predetermined first program;

b. establishing first state data related to said first program after having carried out said first program step:

c. transmitting in accordance with said first program a first communication primitive including first additional data having a first predetermined relationship with said first state data;

followed by the following steps by said second processor:
   d. receiving said first communication primitive;
   e. extracting said first additional data from said first communication primitive and storing said first additional data in said second memory means;
   f. carrying out a second program step in accordance with a second program;
   g. reading said first additional data from said second memory;
   h. transmitting in accordance with said second program to said first device a second communication primitive including second additional data having a second predetermined relationship with said first additional data;

followed by the following steps carried out by said first processor:
   i. receiving said second communication primitive;
   j. extracting said second additional data from said second communication primitive and deriving said first additional data from said second additional data;
   k. checking whether said derived first additional data has said first predetermined relationship with said first state data; if not, either discontinuing said first program or starting a recovery process; if so, continuing with:
   l. carrying out a third program step in accordance with said first program.

Thus, the protection against failure of a device, e.g. due to power loss, is obtained by augmenting the ordinary communication between the devices with additional data which is essentially private to the device to be protected. The device to be protected communicates via the other device to itself by transmitting additional data pertaining to its own internal state.

The state of a device comprises all data necessary for a program running on the device to be able to continue with the next program step (l) in the program after having received a reply from the other device. Some of the state data may be called "persistent state data", i.e. data to be stored by the device for a period possibly extending beyond the end of the protocol, e.g. by utilizing non-volatile memory such as EEPROM. Moreover, there is "volatile state data", that is related to optional next program steps in the program running on the device. Which option is chosen may depend on the instructions received from the other device. The program needs to store these state data to be able to continue the program at its proper point after having received instructions from the other device. Usually, these state data are stored in volatile memory. Thus, these state data may be lost after a power interruption. Failure of power might especially occur when contactless smart cards are used.

The second device, after having received a communication primitive of the first device extracts the first additional data from the communication primitive and stores it in its own memory. After having carried out a next program step in its own program, the second device adds second additional data to a communication primitive to be transmitted to the first device. This second additional data has a predetermined relationship with the first additional data. The first device will receive the second additional data transmitted by the second device in the next message.

The relationship between the second and first additional data may be simple: they may equal one another. Then, the first device receives the first additional data unaltered by the second device. However, beneficial to efficient use of communication bandwidth, the first additional data, or part of it, may, in a further embodiment, additionally be used by the second device as input to the processing step described in step f. Furthermore, the second device may in addition to storing the first additional data process the first additional data itself provided this processing results in processed second additional data being transmitted to the first device in the second communication primitive for which the first relationship to the first state data can be verified in the first device, e.g. by first inverting the processing done in the second device to the additional data. The modification to the first additional data may in this way convey extra information from the second device to the first device, possibly also resulting in more efficient use of communication bandwidth.

The additional data is used by the first device to check whether the program running on it is waiting at the proper stage. This is done by checking whether the received additional data has the predetermined relationship with the state data. The state data may be stored itself in a non-volatile part of the memory of the first device and will, thus, be present even after a power failure. Alternatively, the non-volatile part of the memory may store data from which these state data may be derived, as will be explained hereinafter.

Preferably, in this first embodiment, the method comprises the following steps after step l:
   m. establishing second state data related to the first program after having carried out said third program step;
   n. transmitting in accordance with the first program to the second device a third communication primitive including third additional data having a third predetermined relationship with both the first and the second state data.

In this latter embodiment the third communication primitive not only includes additional data having a predetermined relationship with the second state data, but also with the first state data. By providing any additional data with data which has a predetermined relationship with all prior state data of all prior program steps in the program in the device to be protected, the device will be able to restore the entire program after a power failure.

The same kind of protection may be obtained with the second device. Therefore, the invention in a second embodiment also relates to a method of communicating between at least a first device and a second device;

the first device comprising a first processor, first memory means and first input/output means, the first memory means and first input/output means being coupled to the first processor;

the second device comprising a second processor, second memory means and second input/output means, the second memory means and second input/output means being coupled to the second processor;

the method comprising at least the following steps carried out by the first processor:
   a. carrying out a first program step in accordance with a predetermined first program;
   b. establishing first state data related to the first program after having carried out the first program step;
   c. transmitting in accordance with the first program a first communication primitive including first additional data having a first predetermined relationship with the first state data;

followed by the following steps by the second processor:
   d. receiving the first communication primitive;
   e. extracting the first additional data from the first communication primitive and storing the first additional data in the second memory means;

f. carrying out a second program step in accordance with a second program and establishing second state data related to the second program after having carried out the second program step;
g. reading the first additional data from the second memory;
h. transmitting in accordance with the second program to the first device a second communication primitive including second additional data having a second predetermined relationship with the first additional data and third additional data having a third predetermined relationship with the second state data;

followed by the following steps carried out by the first processor:

i. receiving the second communication primitive;
j. extracting the second and third additional data from the second communication primitive, storing the third additional data in the first memory means and deriving the first additional data from the second additional data;
k. checking whether the derived first additional data has the first predetermined relationship with the first state data; if not, either discontinuing the first program or starting a recovery process; if so, continuing with:
l. carrying out a third program step in accordance with the first program and establishing third state data related to the first program after having carried out the third program step;
m. reading the third additional data from the first memory means;
n. transmitting in accordance with the first program to the second device a third communication primitive including fourth additional data having a fourth predetermined relationship with the third additional data and fifth additional data having a fifth predetermined relationship with the third state data;

followed by the following steps carried out by the second processor:

o. receiving the third communication primitive;
p. extracting the fourth and fifth additional data from the third communication primitive, storing the fifth additional data in the second memory means and deriving the third additional data from the fourth additional data;
q. checking whether the derived third additional data has the third predetermined relationship with the second state data; if not, either discontinuing the second program or starting a recovery process; if so, continuing with:
r. carrying out a fourth program step in accordance with the second program.

The present invention also relates to distributed processing in the sense that it is not restricted to communications between two devices. It also relates to situations in which one processor is transmitting communication primitives to a shared data storage or data transmission means, such as a central memory which stores this communication primitive. One of a plurality of other devices may read this communication primitive from the central memory. Of course, after having read the communication primitive from the central memory, there must be a mechanism to inform other devices that the communication primitive has been read and processed. This can be done by removing the communication primitive from the central memory after being read. However, alternatively, the communication primitive may remain stored in the central memory. Then, an indication may be added to the communication primitive in the central memory to inform other devices that the communication primitive has been read by one device and need not be processed by another device.

The relationship between the additional data and the state data may be based on using one or more of the following methods, either alone or in combination: applying an encryption method, applying a cryptographic hash function, and applying an encryption with one-time pad function.

For carrying out the method in accordance with the first embodiment of the present invention, the invention also relates to a system as claimed in independent claim 10.

For carrying out a method in according with the second embodiment of the present invention, the present invention also relates to a system as claimed in independent claim 11.

The present invention also relates to devices arranged to communicate with one another for carrying out the method in accordance with the invention. Therefore, the invention also relates to a device comprising a processor, memory means and input/output means, the memory means and input/output means being coupled to the processor;

the processor being arranged to carry out at least the following steps:

a. carrying out a first program step in accordance with a predetermined program;
b. establishing first state data related to said program after having carried out said first program step;
c. transmitting in accordance with said program a first communication primitive including first additional data having a predetermined relationship with said first state data;
d. receiving a second communication primitive from another device;
e. extracting second additional data from said second communication primitive and deriving said first additional data from said second additional data;
f. checking whether said derived first additional data has said predetermined relationship with said state data; if not, either discontinuing said program or starting a recovery process; if so, continuing with:
g. carrying out a second program step in accordance with said program.

Such a device may be a smart card.

Preferably, the processor is arranged to carry out the following steps after an interruption and restoration of power to the processor:

receiving from either the other device or a central memory at least one communication primitive having a predetermined relationship with last state data established in accordance with a last program step carried out by the first program;

resuming running the first program with a further program step following the last program step.

The present invention also relates to a device, which may be a terminal arranged to communicate with a smart card, comprising a processor, memory means and input/output means, the memory means and input/output means being coupled to the processor;

the processor being arranged to carry out the following steps:

a. receiving a first communication primitive from another device;
b. recognizing that the first communication primitive comprises additional data that has a first predetermined relationship with state data related to a first program running on the another device;
c. extracting the additional data from the first communication primitive and storing the additional data in the memory means;

d. carrying out a program step in accordance with a second program;
e. reading the first additional data from the memory;
f. transmitting in accordance with the second program to the another device a second communication primitive including the second additional data having a second predetermined relationship with the first additional data.

The present invention will be illustrated with reference to some drawings which are intended for illustration purposes only. The present invention is only limited in scope by the annexed claims.

BRIEF DESCRIPTION OF THE DRAWINGS

FIGS. 3a and 3b show a flow diagram of the method of the invention in accordance with a first embodiment;

DETAILED DESCRIPTION

Figure 1:
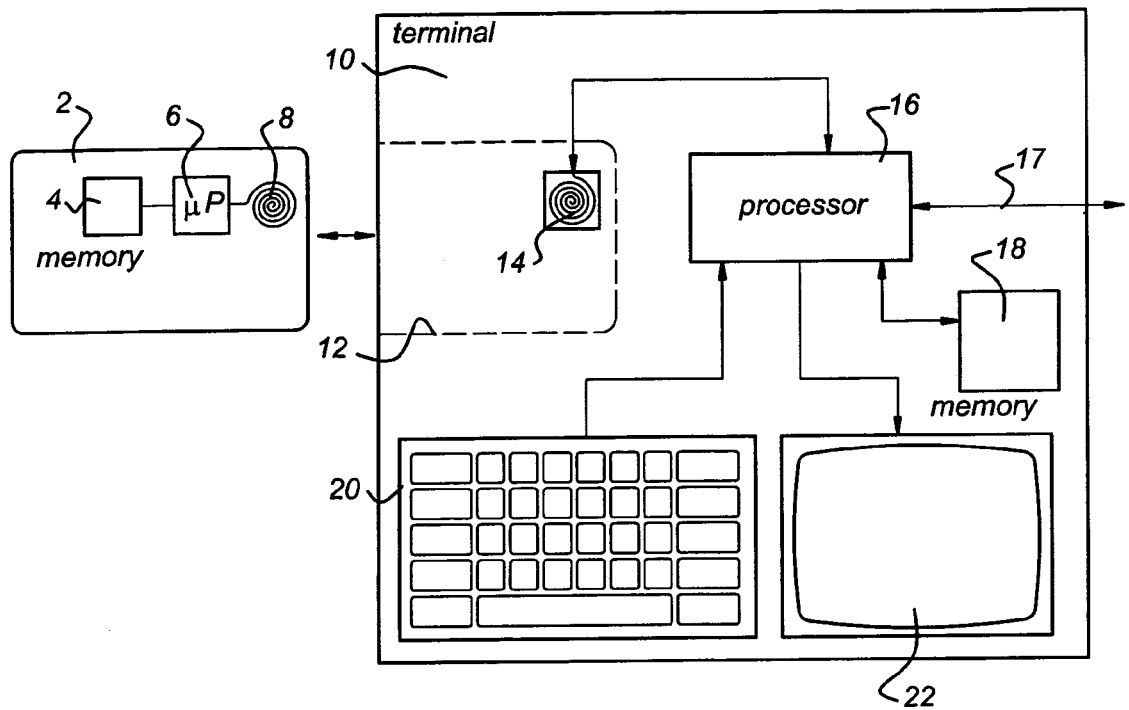
FIG. 1 shows a schematic diagram of a terminal and a contactless smart card arranged to communicate with one another in accordance with the prior art.

FIG. 1 shows a smart card 2 provided with a microprocessor 6 connected to a memory 4 and a coil 8.

The coil 8 is for contactless communication with another device, such as a terminal 10, through electromagnetic energy, as is known to persons skilled in the art. Preferably, power necessary for the microprocessor 6 to operate is also provided via the coil 8 from the other device, e.g. the terminal 10. How this is done is also known to persons skilled in the art and needs no further explanation here. Of course, the coil 8 may be substituted by any other type of interface means, or input/output means known in the art. The coil 8 may, for instance, be substituted by electrically conducting pads by means of which an electrical contact can be made with the terminal 10.

The memory 4 has been drawn as a single block. However, the memory 4 will normally comprise RAM (Random Access Memory), ROM (Read Only Memory), and EEPROM (Electrically Erasable Programmable Read Only Memory). These types of memory are known to persons skilled in The art. If necessary, other memory types may be added to the smart card 2. The EEPROM will be used by the microprocessor to store information on the card 2 itself in a non-volatile manner, i.e. it remains stored in the EEPROM, even after a power failure.

The terminal 10 comprises a coil 14. The coil 14 is used by the terminal 10 to communicate with the smart card 2 via the coil 8 of the smart card 2. Both power and data will be transmitted through the coil 14 to the smart card 2, as is known to persons skilled in the art. Of course, when the smart card 2 has another type of input/output means than coil 8, the terminal 10 may need to be provided with a suitable other type of input/output means. Therefore, coil 14 may be substituted for by any other type of input/output means known from the art, e.g. connectors for making an electrically conductive contact.

The processor 16 of the terminal 10 is also connected to a memory 18, a display 22, and a keyboard 20. The display 22 may be of any type known in the art, e.g. a monitor or an LCD display. The keyboard 20 may be substituted by any other type of input means for providing a user with the possibility of inputting relevant data like a touch screen or any other type of input means known from the art. The keyboard 20 or equivalent means, and the display 22 may be absent.

Preferably, the processor 16 may be coupled to other remote processors (not shown) through a communication line 17. Then, the remote processor(s) may execute part of the communication protocol with the smart card 2. This is for instance necessary when the transaction between the terminal 10 and the smart card 2 relates to a debiting or crediting transaction regarding an account held by a remote device.

The memory 18 has been shown as a single block. However, in practice the memory 18 will comprise several types of memory including possibly one or more of the following memory types: RAM, ROM, EEPROM, and a hard disk. As in the smart card 2 the non-volatile memory types store executable programs and other data required for the intended functions of the device. Typically, at least part of the working memory and the non-volatile memory type is for exclusive use by the device while executing programs.

Usually, communication between the terminal 10 and the smart card 2 is not permanent or fixed and may be (re-) initiated at any convenient time. Such a situation is typical for communications between smart cards and terminals. However, such communications also occur in a client-server relation between computers communicating with one another through a data network such as the Internet. Therefore, the present invention is not restricted to smart cards and terminals for communicating with smart cards only but is also applicable to other devices arranged to communicate with one another. Data communications between devices typically take place as an exchange of units of data, usually referred to as "packages", "messages", or "communication primitives". Thus, within the context of the present invention, a communication primitive is any type of message including, for instance, instructions, statements, and/or data. Such a communication primitive comprises a header and a payload as is known to persons skilled in the art.

Figure 2:
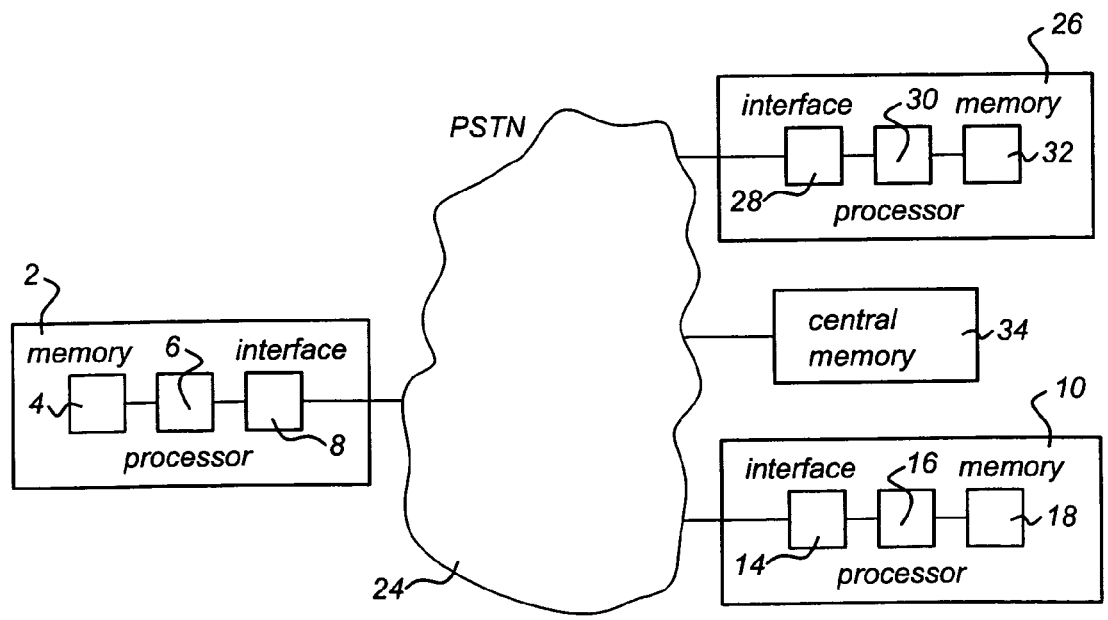
FIG. 2 shows three devices able to communicate with one another through a communication network in order to illustrate the further embodiment of the present invention.

The present invention is also applicable to three or more devices arranged to communicate with one another through a communication network. FIG. 2 schematically shows such a situation. The devices 2 and 10 may refer to the same type of devices as referred to in FIG. 1.

Device 26 is arranged to communicate with other devices and comprises at least a processor 30 connected to an interface 28 and a memory 32. The interface 28 functions as the input/output means between the processor 30 and a communication network 24. The communication network 24 may, e.g., be the PSTN (Public Switched Telephone Network) or any other kind of communication network, either WAN (Wide Area Network) or LAN (Local Area Network), or other. It may also be the Internet. The interface 28 may be of any type known to persons skilled in the art.

The memory 32 has been shown as one single block. However, practically the memory 32 will comprise RAM, ROM, EEPROM, or any other kind of memory, either alone or in combination, as is known to persons skilled in the art. They may be realized in one or more physical units.

As will be explained below, for implementing one special embodiment of the present invention, there may be a central memory 34 which is accessible by any of the devices 2, 10, 26 through the network 24 for storing and extracting data. The central memory 34 may be provided with some intelligence (not shown) for carrying out storing, reading and erasing actions, as is known to persons skilled in the art. Thus, the central memory 34 may be part of a shared data storage or data transmission means.

The network 24 that connects the devices 2, 10, 26 may be publicly accessible in the sense that many devices may simultaneously use the network, using any known network-allocation procedure to perform communication in a pseudo private fashion. Sharing the network allows data communication to be shared by any of the other devices connected to the network. Therefore, when using a shared network the privacy of communicated data as well as of the pattern of communication does not actually exist. Then, if required, the privacy of the users of the devices must be provided by other means, often including cryptography. On the other hand, sharing the data communicated by any of the devices connected to the shared network allows the communication between the devices connected to the media in fact to be performed by a number of physically distinct devices which for the purpose of a particular communication collaborate as a single "logical" device.

A device or equally a collection of collaborating devices takes part in the communication either in the role of initiator, commonly referred to as the "client", or in the role of respondent, commonly referred to as the "server". Consequently, a particular sequence of messages will be exchanged between the client and the server in order to provide a "service" which is being delivered by the server to the client. In the arrangement shown in FIG. 1 the terminal 10 is the client whereas the smart card 2 is the server.

The system of communicating devices may also include devices which are realized as distinct processes, or threads of control, on a single computer that communicates via a shared memory.

The data communication between such devices, of any kind or structure, commonly is performed in an orderly fashion with a sequence of messages being exchanged between the devices, starting with an initial message from the client. For the purpose of the communication, the message or communication primitives are identifiable by the receiving party as appropriate in the ordered sequence of messages.

Each message or communication primitive received conveys information required by the receiving device to proceed a single step forward toward the goal of the communication sequence. To that end the receiving device implements in some form functions commonly known as a "state engine" to recognize the received communication primitive as fitting in the sequence and, if appropriate, to further interpret the data in the communication primitive. The state engine in general comprises executable codes and descriptive data stored in the memory of the device that in combination describes
 (1) which message is to be expected;
 (2) the way to process any data contained in the message; and
 (3) which message needs to be sent in response.

In particular the working memory of the receiving device may contain such descriptive data which may be updated immediately before a message has been sent in its entirety to the other device to reflect the progress made in the orderly sequence of messages. The working memory of the receiving device may also comprise the results of processing the received message data, e.g. modifying or storing any data received in the messages. Such descriptive data in the working memory is usually referred to as "state data" or briefly "state".

Logical devices 2, 10, 26 communicating in accordance with the present invention by means of orderly exchanging communication primitives each maintain in the memory 4, 18, 32 data defining the state of the communication.

The state data will normally be stored in volatile memory. Thus, after a power failure, it is not certain that the state data in the volatile memory is still valid. It may have been lost partially or entirely. In order to confirm that the state data within the working memory is still valid after the device has received a next communication primitive of the other device the present invention proposes a special method which will be explained hereinafter. It is to be understood that the method also protects against partial or entire loss of state data due to other causes than power failure.

Figure 3B:
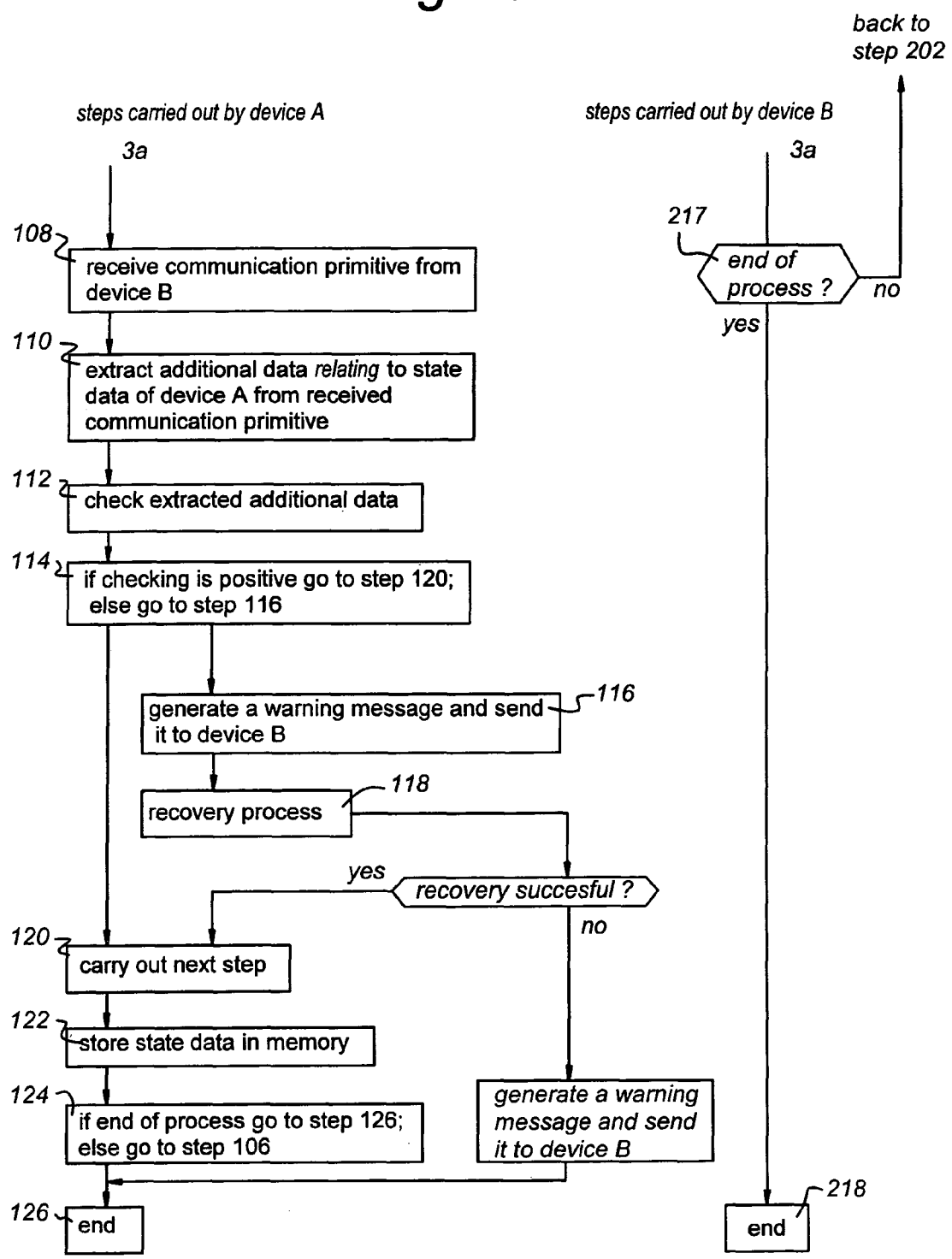

In accordance with the present invention, in the system and method described at least one of the communication devices includes additional data in at least one of the communication primitives it sends to the other device. This additional data is a representation of the internal state as generally described by data stored in its working memory. This will be further illustrated with reference to FIGS. 3a and 3b. In FIGS. 3a and 3b a communication method in accordance with the invention is illustrated between two devices, i.e. a device A (the server, for instance smart card 2) and device B (the client, for instance the terminal 10).

Device A is typically a server which has to maintain state data relating to the messages received and the data these messages contain. Specifically, any security status, such as authentication or an established temporary encryption key, obtained by the client in the course of the on-going exchanging of communication primitives may be part of the server state data.

Device B is typically a client and typically contains special processing instructions to handle such a communication primitive that includes such additional data. Specifically, the client, as part of processing the received communication primitive, will extract the additional data from the communication primitive as will explained hereinafter.

The communication process starts with device B sending a communication request to device A in order to carry out a predetermined protocol with device A (step 200).

In step 100, device A receives the communication request from device B and starts the communication.

The next step, step 102, is to carry out a first program step in accordance with a predetermined program in reply to the communication request received from device B.

After having executed the first program step device A stores in its working memory state data related to the point in the program where the program has to wait for further data and/or instructions of device B, or data from which the state data can be derived, step 104.

In step 106, in order to receive the proper input from device B, device A sends a communication primitive including additional data which has a predetermined relationship to its own state data to device B.

In step 202, device B receives the message from device A.

In step 204, device B checks whether the message received comprises an end of process instruction. If so, device B goes to the end of its program (step 218). If not, the device B continues with step 206 in which device B extracts the additional data regarding the state data of device A from the received message.

In step 208, device B stores this additional data in its memory 18, preferably without processing this additional data.

In step 210, device B carries out a next program step in accordance with its own program.

In step 212, device B stores state data relating to its own process in its memory 18.

In step 214, device B reads the additional data relating to the state data of device A, which was stored in memory 18 in step 208, from memory 18.

In step 216, device B sends a communication primitive including at least this latter additional data to device A. This communication primitive may further comprise instructions to be executed by device A.

In step 217 device B checks whether its process has reached its end. If so, it jumps to step 218 (end). If not, it jumps back to step 202, and waits for a further message of device A.

In step 108, device A receives the communication primitive from device B.

In step 110, device A extracts the additional data related to the state data of device A from the received communication primitive.

In step 112, device A checks whether the extracted additional data is correct. This may be done in several ways. For example, when device A has stored its last valid state data in memory, it can simply compare the extracted additional data with these stored data to check whether they are equal. Alternatively, device A may have stored data from which the last valid state data can be uniquely derived. An example will be given below with reference to FIG. 4. Then device A has to derive the last valid state data first from these stored data, after which a comparison with the extracted additional data can be made.

If the check is found to be positive device A is allowed to continue the running program. Then it continues with step 120 via step 114. However, if it is established that the checking step 112 does not provide a positive result somewhere an error has occurred. Such an error may be caused by different circumstances. For instance, there may have been a power failure to device A resulting in a partial or entire loss of the state data stored in memory 8. Another reason may be that the received additional data has been changed accidentally or on purpose. Whatever the reason is that the checked process is negative the program in device A cannot just continue running. Now two different steps can be made. Either, after possibly having informed device B via a warning message that an error has occurred (step 116), device A starts a recovery process (step 118) or jumps to the end of its program (not indicated in FIG. 3b).

The recovery process (step 118) is possible when the additional data received from device B comprises enough and reliable information for device A to derive from it all necessary state data to continue its program at the point where the last program step was made prior to waiting for further input from device B. After a correct recovery process, which is checked in step 119, the program can continue with step 120. If the recovery has not been successful a message to that end may be generated and transmitted to device B (step 121), and the program stops (step 126).

In step 120, the device A carries out a next program step in accordance with its own program.

In step 122, once again, after having carried out the next program step, device A stores the state data valid by that time in its memory 8, or data from which the state data can be derived.

If, as indicated in step 124, it is established that the program can be finished, it goes to step 126. Else, the program continues with step 106 in order to start a new cycle in accordance with the present invention. After step 126 the program may continue with step 100.

During the recovery step 118, the device A will examine whether or not the received additional data from device B is associated with a state of a point in its program where it could have been if no error would have occurred. In most cases, this will only be possible if device A had stored some relevant data in its non-volatile memory part, which is still present after any power failure. These relevant data in the non-volatile memory part need not be huge. Most of the data may have been stored in the volatile part of the memory 8 and may be received back from device B in the next communication primitive, e.g., contained in the additional data.

The recovery process can be easily implemented when the device A generates the additional data at any time such that it has a predetermined relationship not only with last state data in the running program, but also with all prior state data. Then, it is easier for the device A to establish which program steps were already taken in the program and, thus, which states were already obtained in the past.

The invention is not limited to the generation of such additional data with a predetermined relationship with state data in device A only. It is also applicable to device B. Thus, also device B may be provided with the option of generating additional data related to the state data of the program running on the device B. Such additional data generated by device B will be transmitted to device A with the next communication primitive and will be extracted from any communication primitive by device A. After having executed any instruction, device A will insert further additional data having a predetermined relationship with (e.g., they may be equal to the additional data received from device B in a next communication primitive to be transmitted to device B. Then, device B has the same level of protection as has device A.

For both device A and device B, the additional data as generated may have a predetermined relationship with all prior state data within the respective devices A and B.

In the explanation to FIGS. 3a and 3b given above a simple relationship between the additional data received by device B and later retransmitted to device A has been assumed: they may equal one another. Then, device A receives the additional data unaltered by device B. However, beneficial to efficient use of communication bandwidth, the additional data, or part of it, may, in a further embodiment, additionally be used by device B as input to the processing step described in step 210. Furthermore, device B may in addition to storing the received additional data process the received additional data itself provided this processing results in processed new additional data being transmitted to device A for which the relationship to the state data in device A can be verified by device A, e.g. by first inverting the processing done in device B to the additional data. The modification to the additional data may in this way convey extra information from the second device to the first device, possibly also resulting in more efficient use of communication bandwidth.

The present invention is also applicable to a distributed environment as shown in FIG. 2. Then, device A may e.g. be smart card 2. However, instead of directly communicating all communication primitives to one device B, device A may actually send its communication primitives first to the central memory 34. Two or more devices 10, 26 are arranged to check with the central memory 34, at times that they have executing time available, whether or not the central memory 34 comprises a communication primitive to be processed. One option is that such a device 10, 26 reads a present communication primitive from the central memory 34 and afterwards removes the communication primitive from the central memory 34. Thus, it can be avoided that another device also reads that communication primitive from central memory 34 in order to process it.

Another option is, that the device having read such a communication primitive present in central memory 34 adds an identification, for instance a flag, to the communication primitive in central memory 34 indicating that the communication primitive has already been read by one of the devices 10, 26 and need not be processed by another device anymore. Then, the central memory 34 will collect all communication primitives during a protocol. When these communication primitives are all related to single state data of the program carried out in device 2, after a power failure or other error, the device 2 can collect all the communication primitives from central memory 34 in order to recover the interrupted process. Of course, in the embodiment where each communication primitive comprises all relevant data from all prior state data of the process in device 2, it is not necessary to store all consecutive communication primitives but only to keep the last communication primitive in store.

Sometimes, after a power interruption and restoration, device 2 may simply request device 10 to retransmit the last communication primitive, and device 2 may be able to resume running its program.

Preferably, the communication primitives comprise identification data for identifying that the communication primitives comprise additional data related to state data in one of the devices 2, 10, 26.

As will be explained below, the relationship between the additional data and the state data, may be based on using encryption technology, cryptographic hash functions (one-time functions) and encryption with a one-way pad.

The most simple relationship between the additional data and the state data is a one-to-one relationship, i.e., the additional data equals the state data valid after the last program step carried out by the program. However, in most cases, state data is confidential and is only allowed to be known by the device concerned. Then, the additional data is not allowed to disclose the state data to the outside world and protection against discovery of this state data is provided.

One option of protecting the state data is to encrypt it with an encryption key only known to the device related to that state data. The encrypted state data is then sent as the additional data in the communication primitive to the other device (or to the central memory 34). The device stores the state data (or other data from which the state data can directly be derived) in its working memory. After having received the next communication primitive of the other device the device checks whether the additional data received from the other device equals the encrypted form of the state data. To that end, it decrypts the received additional data and compares the decrypted additional data with the stored state data. Alternatively, it can encrypt its stored state data and compare the result with the received additional data.

Both in cases where the additional data comprises the state data itself and cases where it comprises encrypted state data, using a cryptographic hash (one-way function) can further enhance the security. Such a cryptographic hash is generated by the device associated with the state data, preferably, using a cryptographic key, preferably, only known to that device in a manner known to persons skilled in the art. Such a hash is added to the additional data and does not alter it. However, the hash has a predetermined relationship with the content of the additional data. Therefore, if the content of the additional data is altered accidentally or on purpose this will be established directly by checking the relationship between the hash and the content of the altered additional data. By using such a hash the device, upon receiving the returned additional data with the hash, can not only check the validity of the returned additional data but also use it to derive state data from it if its own state data has been lost partly or entirely. Such derived state data may be used to resume a program that is, e.g., interrupted by a power failure.

Advantageously, the cryptographic key used either as encryption key or hashing key is derived from a random or pseudo random value, for instance, generated when the device receives it first communication primitive. This (pseudo) random value may have a relationship with the content of the communication primitive received. The device stores this (pseudo) random value in its non-volatile memory part prior to sending a responding communication primitive to the other device.

The (pseudo) random value may be used as a value from which state data can be derived. Alternatively, it may be used as a cryptographic key either for the encryption process or the hashing process or both. Moreover, in a further embodiment, the cryptographic key changes each time an encryption or a hashing process is used, which further promotes security. Of course, then, each time a new cryptographic key is used its value may need to be stored in the non-volatile part of the memory. Any method of generating consecutive cryptographic keys may be used. For instance, a new key may be generated by a combination between an existing key and some content of a received communication primitive or by combining two earlier keys in a specified way. However, using one-way (hash) functions may advantageously be used as will be explained hereinafter with reference to FIG. 4.

Figure 4:
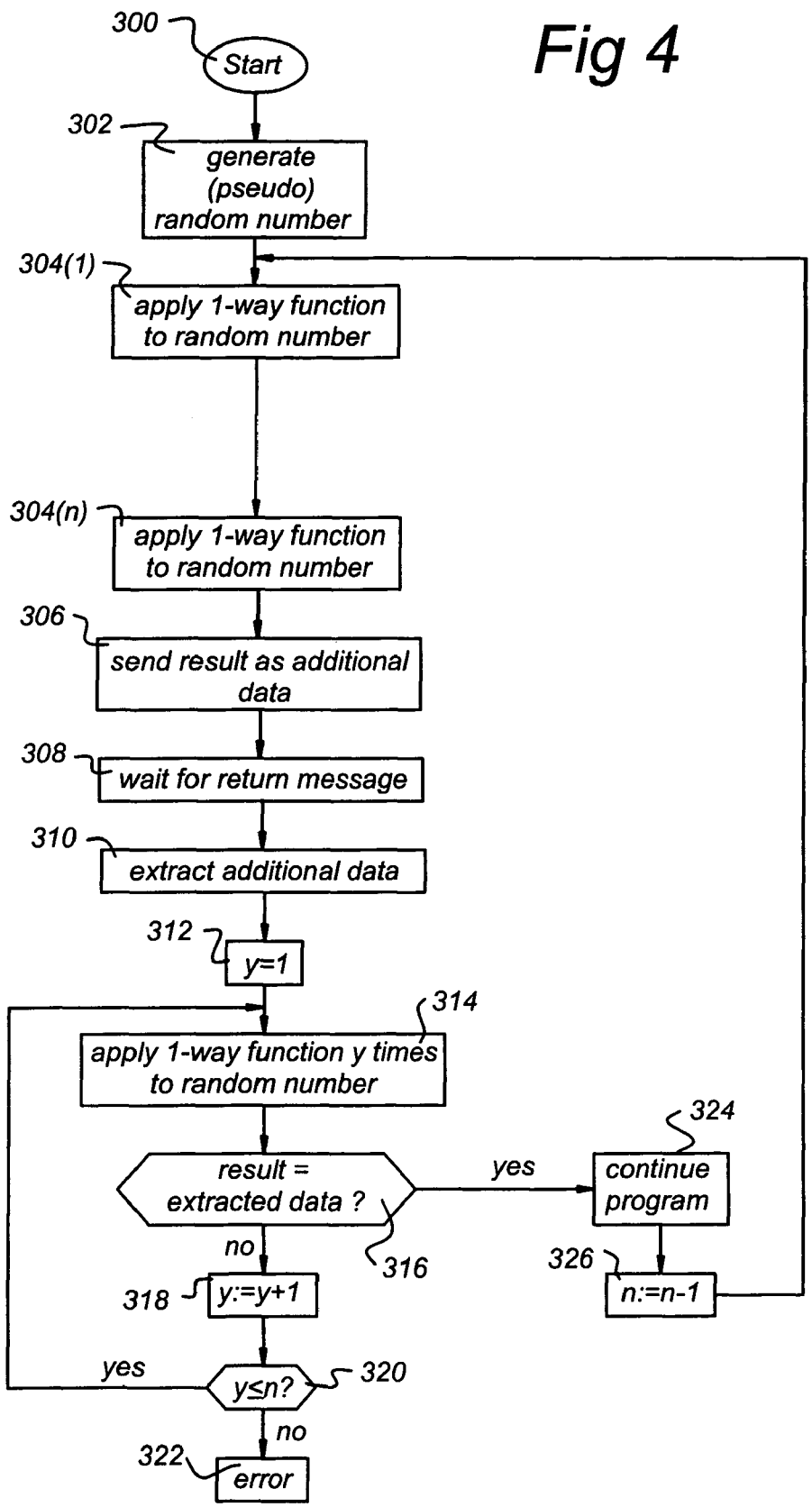
FIG. 4 shows a mechanism to generate state data.

FIG. 4 shows a flow diagram of using a (pseudo) random number used to derive at state data after a return message has been received. After the start, step 300, in step 302, the device concerned generates the (pseudo) random number that may be stored in the non-volatile memory. This may be done in any way known to persons skilled in the art. The device applies a one-way function to this random number n times, steps 304(1) to 304(n), wherein n has a predetermined value above 0. For instance, n=10 at the start. Using one-way functions is known in the art and needs no further explanation here.

The result of step 304(n) is transmitted as additional data in the next message by the device to another device (or to memory 34), step 306. In step 308, the device waits for a return message.

After having received such a return message the device extracts the additional data from the return message, step 310. In steps 312 to 320, the device applies the one-way function to the random number stored in non-volatile memory as many times until the result obtained equals the extracted additional data. If no errors have occurred, the first time, this will be n times. Then, the program knows that the last program step carried out was related to the first possible state, and the program continues with state number 1, step 324. If, after n times applying the one-way function to the random number still no match has been achieved an error has occurred and the program continues with an error routine, step 322.

Then, to prepare for the next step, 1 is subtracted from n, step 326, and the process continues with step 304(1). However, in a preferred embodiment, the result of this step may be obtained by caching the required value while performing the iteration in step 318, as is known to persons skilled in the art. So, for any next state in the program, applying the one-way function to the random number is 1 less than in the preceding step. Since a one-way function is used this ensures that an other device is never able to derive the next additional data related to the next state: provided other devices do not know the (pseudo) random number generated in step 302 by the fundamental property of cryptographic one-way functions it is infeasible to reverse the calculation made by the device, and so predict data for the next state.

FIG. 4 relates to a situation in which the random number stored and the one-way function are used to derive at the correct number of the last achieved state in the program.

However, a similar; or the same, scheme can be used to generate a key to be used in an encryption process and or hashing process.

In a hashing process, for instance, the result of step 304(n) is not directly sent as additional data in the next message but this result is used as a key to calculate an authenticating hash over all state data to be transmitted in the next message. This may advantageously be done when the state data comprises more information than just a number of the state concerned. Then, after having received the next return message and having extracted the additional data from the next return message the hash is used to check the correctness of the returned state data. This checked state is used to continue the program. Again, the number of times of applying the one-way function to the stored random number to arrive at a key to be used in the hashing function may be decreased by 1 for any next state to be transmitted. The key used in any transmission step may be stored in non-volatile part of the memory, however, it is not necessary to store the key since it can be derived from the stored random number and the one-way function used.

In an encryption process, the result of step 304(n) is not directly sent as additional data in the next message but this result is used as a key to encrypt all state data to be transmitted in the next message. This may advantageously be done when the state data is not allowed to be revealed to external devices. Then, after having received the next return message and having extracted the additional data from the next return message the additional data is decrypted to obtain state data. This encrypted state data is used to continue the program. Again, the number of times of applying the one-way function to the stored random number to arrive at a key to be used in the encryption process may be decreased by 1 for any next state to be transmitted. The key used in any transmission step may be stored in non-volatile part of the memory, however, it is not necessary to store the key since it can be derived from the stored random number and the one-way function used, and, preferably, from the current value of n identifying the current state possibly included in the additional data.

Keys generated in a way as explained with reference to FIG. 4 can also be used in a process where both hashing and encryption are used.

The invention claimed is:

1. A method of communicating between at least a first device and a second device;
the first device comprising a first processor, first memory means and first input/output means, said first memory means and first input/output means being coupled to said first processor;
the second device comprising a second processor, second memory means and second input/output means, said second memory means and second input/output means being coupled to said second processor;
said method comprising at least the following steps carried out by said first processor:
a. carrying out a first program step in accordance with a predetermined first program;
b. establishing first state data related to said first program after having carried out said first program step;
c. transmitting in accordance with said first program a first communication primitive including first additional data having a first predetermined relationship with said first state data;
followed by the following steps by said second processor:
d. receiving said first communication primitive;
e. extracting said first additional data from said first communication primitive and storing said first additional data in said second memory means;
f. carrying out a second program step in accordance with a second program;
g. reading said first additional data from said second memory;
h. transmitting in accordance with said second program to said first device a second communication primitive including second additional data having a second predetermined relationship with said first additional data;
followed by the following steps carried out by said first processor:
i. receiving said second communication primitive;
j. extracting said second additional data from said second communication primitive and deriving said first additional data from said second additional data;
k. checking whether said derived first additional data has said first predetermined relationship with said first state data; if not, either discontinuing said first program or starting a recovery process; if so, continuing with:
l. carrying out a third program step in accordance with said first program.

2. The method in accordance with claim 1, comprising the following steps after step 1:
m. establishing second state data related to said first program after having carried out said third program step;
n. transmitting in accordance with said first program to said second device a third communication primitive including third additional data having a third predetermined relationship with both said first and said second state data.

3. A method of communicating between at least a first device and a second device;
the first device comprising a first processor, first memory means and first input/output means, said first memory means and first input/output means being coupled to said first processor;
the second device comprising a second processor, second memory means and second input/output means, said second memory means and second input/output means being coupled to said second processor;
said method comprising at least the following steps carried out by said first processor:
a. carrying out a first program step in accordance with a predetermined first program;
b. establishing first state data related to said first program after having carried out said first program step;
c. transmitting in accordance with said first program a first communication primitive including first additional data having a first predetermined relationship with said first state data;
followed by the following steps by said second processor:
d. receiving said first communication primitive;
e. extracting said first additional data from said first communication primitive and storing said first additional data in said second memory means;
f. carrying out a second program step in accordance with a second program and establishing second state data related to said second program after having carried out said second program step;
g. reading said first additional data from said second memory;
h. transmitting in accordance with said second program to said first device a second communication primitive including second additional data having a second predetermined relationship with said first additional data and third additional data having a third predetermined relationship with said second state data;

followed by the following steps carried out by said first processor:

i. receiving said second communication primitive;
j. extracting said second and third additional data from said second communication primitive, storing said third additional data in said first memory means and deriving said first additional data from said second additional data;
k. checking whether said derived first additional data has said first predetermined relationship with said first state data; if not, either discontinuing said first program or starting a recovery process; if so, continuing with:
l. carrying out a third program step in accordance with said first program and establishing third state data related to said first program after having carried out said third program step;
m. reading said third additional data from said first memory means;
n. transmitting in accordance with said first program to said second device a third communication primitive including fourth additional data having a fourth predetermined relationship with said third additional data and fifth additional data having a fifth predetermined relationship with said third state data;

followed by the following steps carried out by said second processor:

o. receiving said third communication primitive;
p. extracting said fourth and fifth additional data from said third communication primitive, storing said fifth additional data in said second memory means and deriving said third additional data from said fourth additional data;
q. checking whether said derived third additional data has said third predetermined relationship with said second state data; if not, either discontinuing said second program or starting a recovery process; if so, continuing with:
r. carrying out a fourth program step in accordance with said second program.

4. The method in accordance with claim 3, wherein step n. comprises the following features: n. transmitting in accordance with said first program to said second device a third communication primitive including said fourth additional data and fifth additional data having a fifth predetermined relationship with both said first and said third state data.

5. The method in accordance with any of the preceding claims, wherein said step c comprises the following sub-steps:

c1. transmitting a first communication primitive including additional data having a first predetermined relationship with said first state data in accordance with said first program to a central memory;
c2. storing said first communication primitive in said central memory; and step d comprises the following sub-steps:
d1. checking whether said central memory has stored said first communication primitive; if not repeating step d1; if so, continuing with step d2;
d2. reading said first communication primitive from said central memory;
d3. removing said first communication primitive from said central memory.

6. The method in accordance with any of claims 1 to 4, wherein said step c comprises the following sub-steps:

c1. transmitting a first communication primitive including additional data having a first predetermined relationship with said first state data in accordance with said first program to a central memory;
c2. storing said first communication primitive in said central memory; and step d comprises the following sub-steps:
d1. checking whether said central memory has stored said first communication primitive; if not repeating step d1; if so, continuing with step d2;
d2. reading said first communication primitive from said central memory;
d3. adding an indication to said first communication primitive in said central memory that said first communication primitive has been read by said second device.

7. The method in accordance with any of claims 1 to 4, wherein at least said first and second communication primitives comprise identification data for identifying said first and second communication primitives to comprise said first additional data.

8. The method in accordance with any of claims 1 to 4, wherein said first relationship is based on using one or more of the following methods, either alone or in combination: applying a first encryption method, applying a first cryptographic hash function, and applying a first encryption with one-time pad function.

9. The method in accordance with any of claims 2 to 4, wherein said third relationship is based on using one or more of the following methods, either alone or in combination: applying a second encryption method, applying a second cryptographic hash function, and applying a second encryption with one-time pad function.

10. A system comprising at least a first device and a second device;

the first device comprising a first processor, first memory means and first input/output means, said first memory means and first input/output means being coupled to said first processor;

the second device comprising a second processor, second memory means and second input/output means, said second memory means and second input/output means being coupled to said second processor;

said first processor being arranged to carry out at least the following steps:

a. carrying out a first program step in accordance with a predetermined first program;
b. establishing first state data related to said first program after having carried out said first program step;
c. transmitting in accordance with said first program a first communication primitive including first additional data having a first predetermined relationship with said first state data;

said second processor being arranged to carry out the following steps after the first processor has carried out the steps a-c:

d. receiving said first communication primitive;
e. extracting said first additional data from said first communication primitive and storing said first additional data in said second memory means;
f. carrying out a second program step in accordance with a second program;
g. reading said first additional data from said second memory;
h. transmitting in accordance with said second program to said first device (2) a second communication primitive including second additional data having a second predetermined relationship with said first additional data;

said first processor being also arranged to carry out the following steps after the second processor has carried out the steps d-h:
i. receiving said second communication primitive;
j. extracting said second additional data from said second communication primitive and deriving said first additional data from said second additional data;
k. checking whether said derived first additional data has said first predetermined relationship with said first state data; if not, either discontinuing said first program or starting a recovery process; if so, continuing with:
l. carrying out a third program step in accordance with said first program.

11. A system comprising at least a first device and a second device;
the first device comprising a first processor, first memory means and first input/output means, said first memory means and first input/output means being coupled to said first processor;
the second device comprising a second processor, second memory means and second input/output means, said second memory means and second input/output means being coupled to said second processor;
said first processor being arranged to carry out at least the following steps:
a. carrying out a first program step in accordance with a predetermined first program;
b. establishing first state data related to said first program after having carried out said first program step;
c. transmitting in accordance with said first program a first communication primitive including first additional data having a first predetermined relationship with said first state data;
said second processor being arranged to carry out the following steps after the first processor has carried out the steps a-c:
d. receiving said first communication primitive;
e. extracting said first additional data from said first communication primitive and storing said first additional data in said second memory means;
f. carrying out a second program step in accordance with a second program and establishing second state data related to said second program after having carried out said second program step;
g. reading said first additional data from said second memory;
h. transmitting in accordance with said second program to said first device a second communication primitive including second additional data having a second predetermined relationship with said first additional data and third additional data having a third predetermined relationship with said second state data;
said first processor being also arranged to carry out the following steps after the second processor has carried out the steps d-h:
i. receiving said second communication primitive;
j. extracting said second and third additional data from said second communication primitive, storing said third additional data in said first memory means (4) and deriving said first additional data from said second additional data;
k. checking whether said derived first additional data has said first predetermined relationship with said first state data; if not, either discontinuing said first program or starting a recovery process; if so, continuing with:
l. carrying out a third program step in accordance with said first program and establishing third state data related to said first program after having carried out said third program step;
m. reading said third additional data from said first memory means;
n. transmitting in accordance with said first program to said second device a third communication primitive including fourth additional data having a fourth predetermined relationship with said third additional data and fifth additional data having a fifth predetermined relationship with said third state data;
said second processor being also arranged to carry out the following steps after said first processor has carried out the steps i-n:
o. receiving said third communication primitive;
p. extracting said fourth and fifth additional data from said third communication primitive, storing said fifth additional data in said second memory means and deriving said third additional data from said fourth additional data;
q. checking whether said derived third additional data has said third predetermined relationship with said second state data; if not, either discontinuing said second program or starting a recovery process; if so, continuing with:
r. carrying out a fourth program step in accordance with said second program.

12. A device comprising a processor, memory means and input/output means, said memory means and input/output means being coupled to said processor;
said processor being arranged to carry out at least the following steps:
a. carrying out a first program step in accordance with a predetermined program;
b. establishing first state data related to said program after having carried out said first program step;
c. transmitting in accordance with said program a first communication primitive including first additional data having a predetermined relationship with said first state data;
d. receiving a second communication primitive from another device;
e. extracting second additional data from said second communication primitive and deriving said first additional data from said second additional data;
f. checking whether said derived first additional data has said predetermined relationship with said state data; if not, either discontinuing said program or starting a recovery process; if so, continuing with:
g. carrying out a second program step in accordance with said program.

13. The device in accordance with claim 12, wherein said processor is arranged to carry out the following steps after step g:
h. establishing second state data related to said program after having carried out said second program step;
i. transmitting in accordance with said program to said second device a third communication primitive including third additional data having a third predetermined relationship with both said first and said second state data.

14. The device in accordance with claim 12 or 13, wherein said device is a smart card.

15. The device in accordance with claim 12 or 13, wherein said processor is arranged to carry out the following steps after an interruption and restoration of power to the processor:

receiving from either the other device or a central memory at least one communication primitive having a predetermined relationship with last state data established in accordance with a last program step carried out by said first program; resuming running said first program with a further program step following said last program step.

16. A computer program product comprising computer executable instructions to be carried out by a computer device comprising a processor, memory means and input/output means, said memory means and input/output means being coupled to said processor, said computer program product allowing said processor to carry out at least the following steps:
   a. carrying out a first program step in accordance with the program;
   b. establishing first state data related to said program after having carried out said first program step;
   c. transmitting in accordance with said program a first communication primitive including first additional data having a predetermined relationship with said first state data;
   d. receiving a second communication primitive from another device;
   e. extracting second additional data from said second communication primitive and deriving said first additional data from said second additional data;
   f. checking whether said derived first additional data has said predetermined relationship with said state data; if not, either discontinuing said program or starting a recovery process; if so, continuing with:
   g. carrying out a second program step in accordance with the program.

17. A computer readable medium provided with a computer program product as claimed in claim 16.

18. A device comprising a processor, memory means and input/output means, said memory means and input/output means being coupled to said processor;
   said processor being arranged to carry out the following steps:
   a. receiving a first communication primitive from another device;
   b. recognizing that the first communication primitive comprises additional data that has a first predetermined relationship with state data related to a first program running on said another device;
   c. extracting said additional data from said first communication primitive and storing said additional data in said memory means;
   d. carrying out a program step in accordance with a second program;
   e. reading said first additional data from said memory;
   f. transmitting in accordance with said second program to said another device a second communication primitive including second additional data having a second predetermined relationship with said first additional data, wherein said processor is arranged to carry out the following sub-steps in step a:
   a1. checking whether a central memory has stored said first communication primitive; if not repeating step a1; if so, continuing with step a2;
   a2. reading said first communication primitive from said central memory;
   a3. removing said first communication primitive from said central memory.

19. A device comprising a processor, memory means and input/output means, said memory means and input/output means being coupled to said processor;
   said processor being arranged to carry out the following steps:
   a. receiving a first communication primitive from another device;
   b. recognizing that the first communication primitive comprises additional data that has a first predetermined relationship with state data related to a first program running on said another device;
   c. extracting said additional data from said first communication primitive and storing said additional data in said memory means;
   d. carrying out a program step in accordance with a second program;
   e. reading said first additional data from said memory;
   f. transmitting in accordance with said second program to said another device a second communication primitive including second additional data having a second predetermined relationship with said first additional data, wherein said processor is arranged to carry out the following sub-steps in step a:
   a1. checking whether a central memory has stored said first communication primitive; if not repeating step a1; if so, continuing with step a2;
   a2. reading said first communication primitive from said central memory;
   a3. adding an indication to said first communication primitive in said central memory that said first communication primitive has been read by said device.

20. The device in accordance with claim 18 or 19, wherein said device is a terminal arranged to communicate with a smart card.

21. A computer program product comprising computer executable instructions to be carried out by a computer device comprising a processor, memory means and input/output means, said memory means and input/output means being coupled to said processor, said computer program product allowing said processor to carry out at least the following steps:
   a. receiving a first communication primitive from another device;
   b. recognizing the first communication primitive to comprise additional data having a predetermined first relationship with state data related to a first program running on said another device;
   c. extracting said additional data from said first communication primitive and storing said additional data in said memory means;
   d. carrying out a program step in accordance with the program;
   e. reading said first additional data from said memory;
   f. transmitting in accordance with said program to said another device a second communication primitive including said second additional data having a second predetermined relationship with said first additional data.

22. A computer readable medium provided with a computer program product as claimed in claim 21.

* * * * *